Oct. 14, 1930.  H. FORD  1,778,633
VEHICLE CONSTRUCTION
Filed Feb. 18, 1929
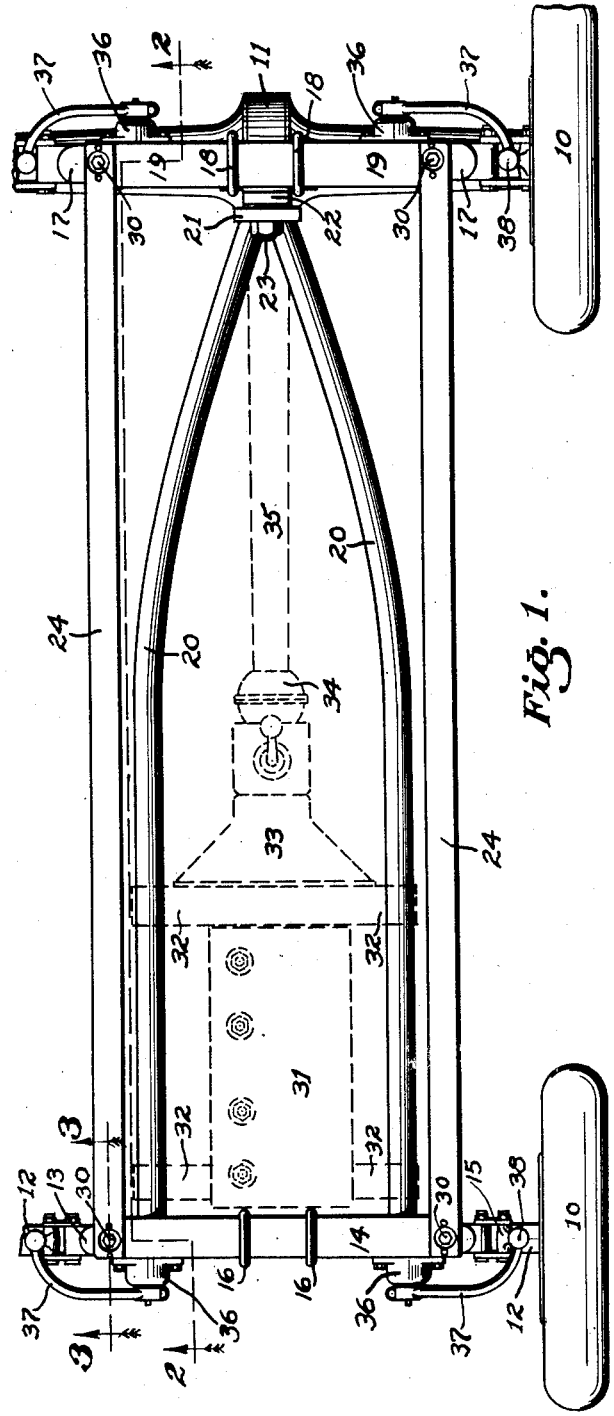
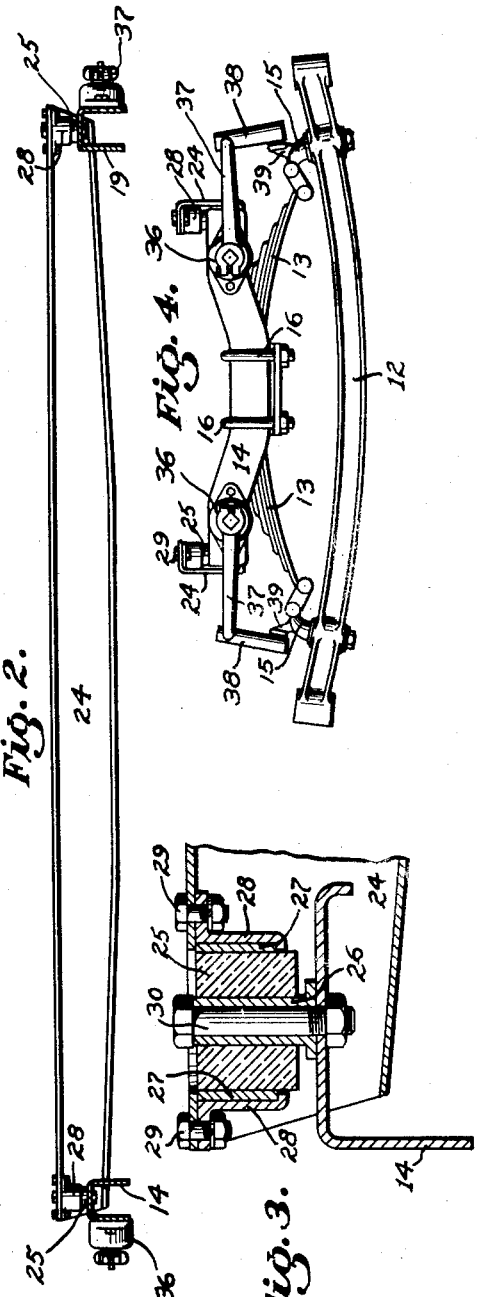
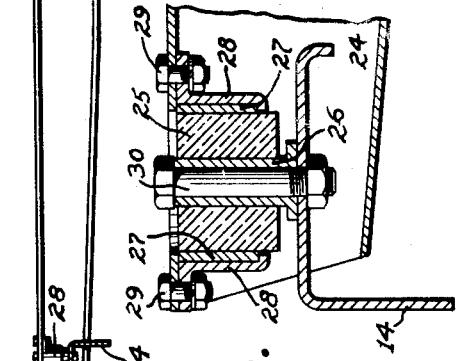
INVENTOR
Henry Ford.
BY C. R. Halbert.
E. L. Davis.
ATTORNEYS.

Patented Oct. 14, 1930

1,778,633

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

VEHICLE CONSTRUCTION

Application filed February 18, 1929. Serial No. 340,734.

The object of my invention is to provide a vehicle construction of simple, durable and inexpensive construction.

Still a further object of my invention is to provide an automotive vehicle with means for eliminating or lessening the amount of vibration transmitted from the engine to the occupants of the body.

Still a further object of my invention is to lessen the vibration noticeable in the body on account of the operation of the engine by building the chassis frame in two parts which are connected together by means of springs or cushions whereby the engine may be bolted to one of the chassis frame parts and the body may be bolted to the other chassis frame part and these two parts of the chassis frame being mounted on springs or cushions relative to each other will not transmit the engine vibration to the occupant of the body.

Still a further object of my invention is to provide a two part chassis frame construction wherein the engine is mounted on one said frame part and the body is mounted on the other said frame part and to so construct these parts that they are connected together at their rear ends by a horizontal longitudinal trunnion and are connected together at their front ends by spaced cushions or springs.

Still a further object of my invention is to provide a two part chassis frame construction wherein the engine is mounted on one of said frame parts and the body mounted on the other frame part, the parts being so constructed that the shock absorber elements may be connected from the engine frame part to the axle of the vehicle so that the reaction of the shock absorbers in their operation is against the engine frame instead of against the body frame whereby the force of these shocks may not cause unnecessary discomfort to the person in the body.

With these and other objects in view, my invention consists in the arrangement, construction, and combination of the various parts of my improved device as described in the specification, claimed in the claims, and illustrated in the accompanying drawings, in which Figure 1 shows a top or plan view of a chassis constructed in accordance with my invention.

Figure 2 shows a vertical sectional view taken on the line 2—2 of Figure 1.

Figure 3 shows a vertical sectional view taken on the line 3—3 of Figure 1, and

Figure 4 shows a front elevation of a chassis frame constructed in accordance with my invention.

Referring to the accompanying drawings, I have used the reference numeral 10 to indicate generally the wheels of an automotive vehicle. These wheels are mounted respectively on the conventional type rear axle 11 and the front axle 12. The front axle is connected by the front spring 13 with a front frame cross member 14. Spring perches 15 of usual construction are used. U bolts 16 are used for securing the frame member 14 to the front springs 13. The rear axle 11 is connected by the spring 17 through the U bolts 18 with the rear cross frame member 19.

The chassis frame is composed of two parts. The inner part has as an integral part thereof the front frame cross member 14. Extending rearwardly from positions near the ends thereof are a pair of very rigid tubular longitudinal frame members 20 which have their rear ends bent toward each other so that they may be secured together at their rear ends by a lug 21. This lug is preferably welded to the rear end of the tubes 20 but may be secured thereto in any other manner which may be desired.

A pad 22 is held in place on the central part of the forward face of the rear frame cross member by means of the U bolts 18. A bolt 23 forms a pivotal connection between the lugs 21 and the pad 22 so that this frame comprising the front frame member 14, the tubes 20 and the lug 21 together form a very rigid frame member.

An auxiliary or a body frame is formed adjacent to the inner frame just described. This outer or body frame member has the two longitudinal members 24 which extend from the front cross frame member to the rear cross frame member. These two outer frame members 24 are each connected to the frame members 14 and 19 by the construction shown in enlarged detail in Figure 3 but are otherwise independent of each other. In this view, a hollow cylindrical block of rubber 25 has a sleeve 26 vulcanized therein and a second sleeve 27 is vulcanized to the exterior of this rubber 25. The outer sleeve 27 is fixed to the frame member 24 by means of a ferrule 28 which has bolts 29 therefor adapted to secure it to the frame member 24.

A bolt 30 is passed through the sleeve 26 and this bolt secures this sleeve 26 to the end of the cross frame cross member 14. It will be noted that this cross frame cross member is of channel section except just at the ends thereof and that the rear web of the channel is notched out just at the ends so as to provide clearance for the bottom portion of the channel frame member 24. The joint between the rear cross frame member 19 and the rear end of the frame member 24 is similar in all respect to the joint shown in Figure 3.

An automobile engine (indicated by the dotted lines 31) of conventional type is secured to the inner part of the chassis frame by the engine legs indicated by the dotted lines 32. The transmission 33 is connected at one end to the engine and to the universal joint 34 at the other end. The universal joint 34 is connected to the torque tube 35. The body of ordinary type which is not however here illustrated is bolted to the outer or body frame members 24 in the manner in which bodies are usually secured to the chassis frame of an automobile.

Shock absorbers 36 of the hydraulic type are connected by the arms 37 with the links 38. The links 38 are universally connected to lugs 39 which extend from the spring perches 15. It will be noted that the front shock absorber bodies are mounted on the front of the front cross frame member 14 and the rear shock absorbers on the rear cross frame member 19. It will therefore be noted that the shock absorber reactions are transmitted to the cross frame members which are, however, connected with body only through the rubber block 25, so that the road shocks which are transmitted to the body are minimized.

The arms 37 are bent or arched whereby the shock absorber bodies may be placed in front of the front cross member and in rear of the rear frame member. This gives a direct vertical pull on the links 38 when the shock absorbers are under load and further economize space and parts.

It will be noted that the rear end of the inner or engine frame is pivotally connected to the rear springs through the members 21, 22 and 23 so that the torque reaction of the engine 31 which is bolted to this engine frame will be taken through the front spring 13 and the front frame cross member 14. This construction further relieves the body from strains and reactions which would cause noise during acceleration or decceleration when the engine torque reaction noises are most noticeable.

It will be further noted that the construction of my improved two part chassis frame is different from standard construction in that the frame longerons are double at each side and insulated from each other, whereby one pair may carry the engine and the other the body thereby eliminating engine noise in the body as much as possible. An independent rear cross frame member is provided which is clamped to the rear spring and which has the shock absorbers mounted thereon so that this rear frame member takes the road shock and the shock absorber reaction.

A further advantage results from connecting the shock absorbers to the frame cross members which are insulated from the body. The bending of the arms 37 makes a compact efficient structure.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In a device of the character described, front and rear axle members, vehicle springs for each of said axles, a rear cross frame member clamped to said rear spring, an inner frame member having its front cross member clamped to the front spring and having its rear end pivotally connected to said rear cross frame member, shock absorbers connecting said cross frame members at the axles, and outer longitudinal frame members yieldingly mounted at the ends of said cross frame members.

2. In a device of the character described, a two part frame member comprising a portion adapted to support the engine and the shock absorbers, and a second portion yieldingly mounted on said first portion and designed to support the body.

January 31st, 1929.

HENRY FORD.